March 14, 1939. O. E. MILLER ET AL 2,150,839
DEPRESSION FORMING AGRICULTURAL IMPLEMENT
Filed Feb. 24, 1938   2 Sheets—Sheet 1
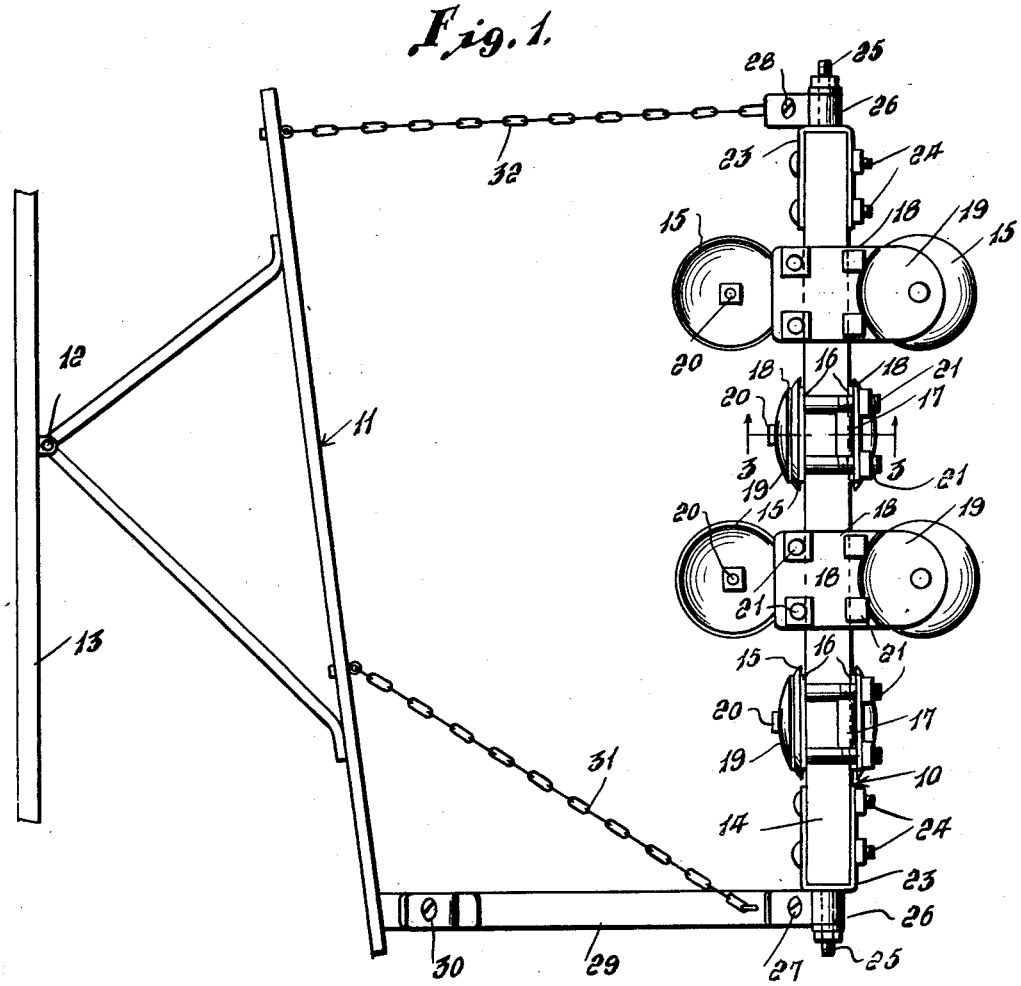
Inventors
Oscar E. Miller
Gustaf E. Miller March 14, 1939.   O. E. MILLER ET AL   2,150,839
DEPRESSION FORMING AGRICULTURAL IMPLEMENT
Filed Feb. 24, 1938   2 Sheets-Sheet 2
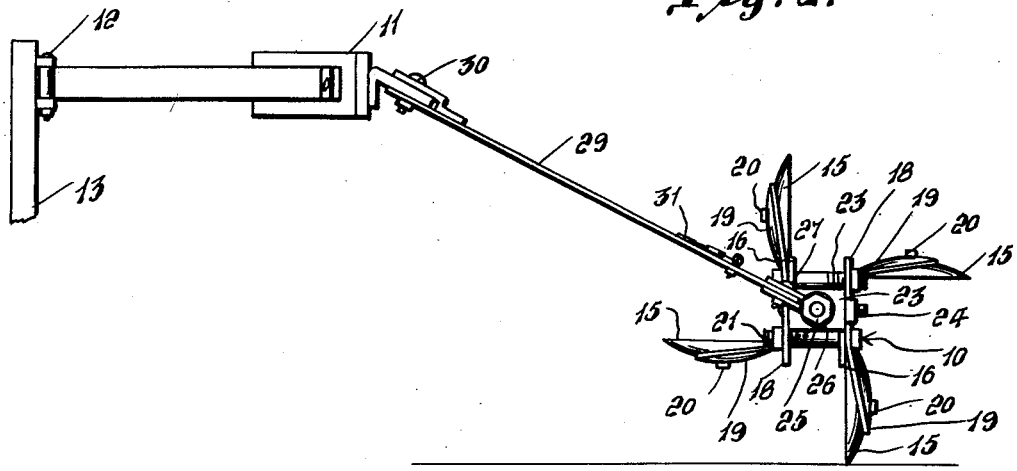
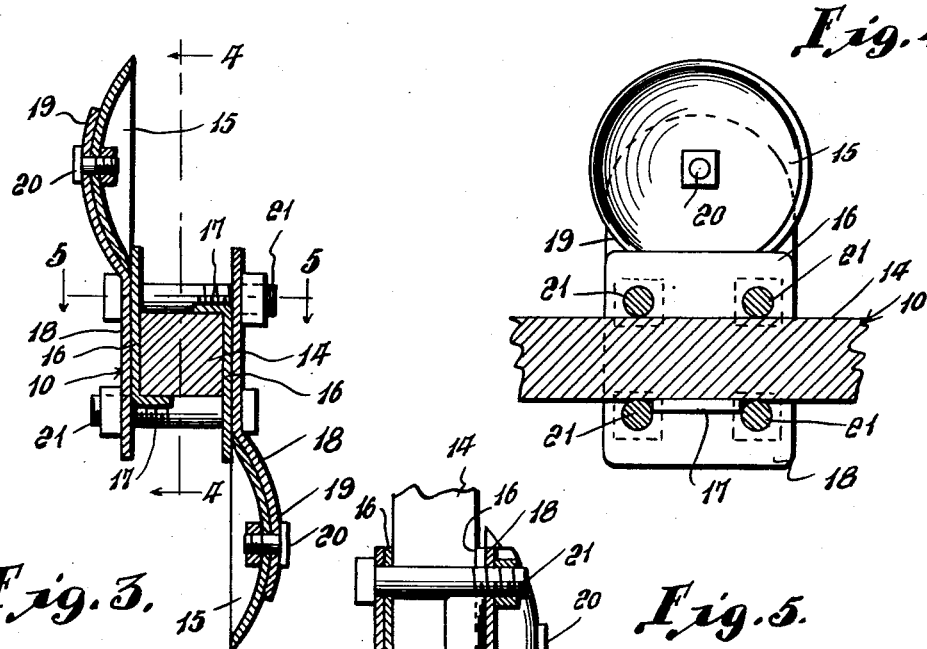
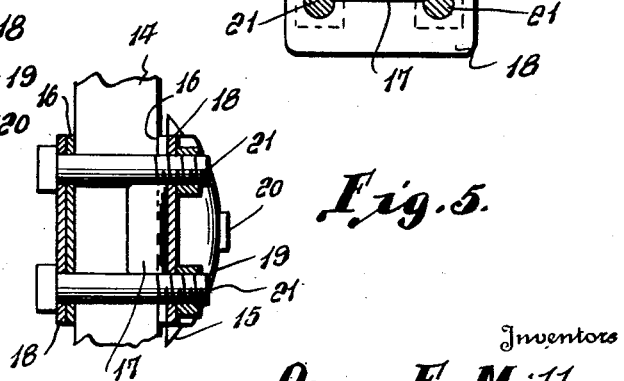
Inventors
Oscar E. Miller
Gustaf E. Miller
By L. F. Randolph
Attorney Patented Mar. 14, 1939

2,150,839

UNITED STATES PATENT OFFICE 2,150,839

DEPRESSION-FORMING AGRICULTURAL IMPLEMENT

Oscar E. Miller and Gustaf E. Miller, Stratton, Nebr.

Application February 24, 1938, Serial No. 192,360

4 Claims. (Cl. 97—52)

This invention relates to agricultural implements particularly to a machine for the constructing of moisture retaining depressions or basins in the surface of cultivated fields. When a field is plowed or tilled, the surface is usually left comparatively smooth which condition has a tendency to create water and wind erosion because there is nothing to retard flood water until it is given ample time to be absorbed by the sub-soil. Therefore the object of this invention is to provide an implement capable of independent operation or may be used to follow a plow or any tillage implement to give the cultivated surface a waffled effect by forming pot-holes, basins or for retaining water and directing it into the sub-soil and which depressions will prevent blowing of soil in windy weather because the surface of the land is left in a roughened condition.

Another object is to provide a basin or depression forming machine of the character as set forth without supplementary carrying wheels, but with a spaded rotor itself serving as the carrier. It will be clearly understood that in the process of forming basins the concavity of discs or spades must be toward the direction of travel which affords a scoop-like action and as the machine is pulled forward said discs or spades dig into and fill with soil lifting it and unloading as the rotor revolves thus forming basins, holes or depressions.

A further object is to provide a basin forming mechanism of this character without employing any mechanical elements to cause the spade rotor to drag or slide in the act of forming basins. It is obvious that in the course of operation when one spade is in the ground, the spade affording the next leg or spoke strikes the surface of the soil on its convex surface causing the rotor to slide forward until the resistance of accumulated soil against spade in the ground forces the next spade into the soil and a continuous series of such operations gives the field a waffled effect.

A still further object is to provide a machine of the character as set forth adapted during transporting from one field to another to be drawn in the opposite direction to that of use, having the convexity of the spades toward the direction of travel, the convex surface providing an abrupt edge as it comes in contact with the ground to cause continuous rotation without forming basins.

Still another object is to provide a means for forming basins on top of listed ridges. Washing out or burying seed planted in listed furrows is a common hazard among farmers and one purpose of this machine is to arrest a large percent of such washing by constructing basins to retain the water on top of the ridge which does not in any way disturb the seed bed in the furrow.

Other objects will appear in the course of the following description, it being understood that various changes may be made in the arrangement, form, size, proportion of parts and minor details, within the spirit and scope of the invention as claimed.

In the accompanying drawings illustrating an operative embodiment:

Figure 1 is a plan view showing the attachment or implement;

Figure 2 is an end elevation of the parts of Figure 1;

Figure 3 is a detail cross section taken on the line 3—3 of Figure 1;

Figures 4 and 5 are detail sections taken on the lines 4—4 and 5—5 of Figure 3, respectively;

Figure 6 is a diagrammatic view showing the use of the invention; and

Figure 7 is a detail fragmentary section showing the provision of depressions or basins at the top of listed ridges.

Referring specifically to the drawings wherein like reference characters designate like or similar parts, it may first be mentioned with respect to Figure 6, that the invention is used to provide in plowed or tilled soil, basins or depressions such as D, the soil being excavated therefrom and deposited at C. Such plowed or tilled soil is generally designated B and the sub-soil is designated A. The invention may also be used to provide, as shown in Figure 7, basins or depressions at H at the top of listed ridges F. In this view, G represents furrows and E indicates the sub-soil.

The implement or attachment as a whole is designated 10. This implement is adapted to be pulled over the field in any desired manner for instance being connected to a plow frame as at 11 which in turn is connected in the usual manner at 12 to a tractor fragmentarily shown at 13.

Said implement 10 comprises a rotatable axle, body or shaft at 14, preferably square in cross section as shown. Pairs of spades 15 of any desired number are disposed longitudinally of the shaft 14 with the spades of alternate pairs located at right angles to each other as shown. In order to secure the spades rigidly but adjustably to the shaft 14, plates 16 engage spaces of the shaft, having angular flanges 17 thereon engaging right angular faces of the shaft. Brackets 18 are removably disposed against the plates 16, having concave or similar portions 19 in which the spades 15 are removably and rotatably adjustably secured by means of bolts 20, the periphery or edge portion of the spades being overlapped by ends of the plates 16. Bolts 21 removably pass through the plates 16 and portions of the brackets 19 to secure the same in place and to apply clamping pressure on spades 15.

It is to be understood that although the spades 15 are shown as concave discs, they may be of any other desired form however preferably embodying a concavity for lifting the soil to form the basins or depressions and also to provide the rotational adjustment on the bolts 20 as pivots, when an edge portion has become worn. The pairs of spades are also preferably equidistantly spaced apart, as is essential when the implement is used on listed ridges to provide the depressions H as in Figure 7.

The axle or shaft 14 has U-shaped brackets 23 detachably bolted at 24 at the opposite ends thereof and from which extend stubs or trunnions 25. Said stubs or trunnions 25 are journaled in bearings 26, generally of U-shape and provided with bolts 27 and 28, respectively. Bolt 27 preferably pivotally connects to a draw and equalizer bar 29 pivoted by a vertical bolt at 30 to the plow frame 11. A chain or flexible element 31 extends from the drawbar 29 to the frame 11, at an angle to the said bar 29 while another chain or flexible element 32 extends from the plow frame 11 to the bolt 28.

By having the bar 29 slightly at an angle to the plow frame 11, there is an action of side draft, just enough to tension chains 31 and 32 at all times and the length of the chains and angles of the parts may be varied according to the side draft desired. This variance of the angularity of the bar 29 also provides that the convexity of the disc spades become prominent at the point of penetration and cause a hindrance to the cutting edge resulting in a variance in the depression made in the soil.

In the course of revolving, the weight of the implement is placed directly on the portions of the spades 15 which are engaged with the soil and by adjusting the hitch of the implement below the axis of rotation, it has the tendency to force the blades or spades into the soil there being no weight on the bearings at any time.

It will be noted that the implement has a minimum of moving parts, that the entire weight of the machine is on the spades 15, that the parts are adjustable, the soil is readily lifted and unloaded and there are no mechanical elements to trip, drag or slide in order to provide the depressions or basins.

Various changes may be resorted to provided they fall within the spirit and scope of the invention.

We claim as our invention:

1. A basin-forming agricultural implement comprising a rotatable body, said body having a group of spades, said body having a second group of spades, the spades of one group being alternated with respect to the spades of the other group, said spades being concave discs, and means mounting the discs for rotatable adjustment when an edge portion becomes dull.

2. A basin-forming agricultural implement comprising a rotatable body, said body having a group of spades, said body having a second group of spades, the spades of one group being alternated with respect to the spades of the other group, bearings for said body, a draw member to which one of the bearings is fastened, a flexible attaching element extending from the other bearing, and a flexible attaching element extending from the draw member.

3. A basin-forming agricultural implement comprising a rotatable body, said body having a group of spades, said body having a second group of spades, the spades of one group being alternated with respect to the spades of the other group, bearing members in which the body is journaled, draft means angularly disposed connected to the opposite bearing means, said spades being concave discs, plates in engagement with the body, brackets in engagement with the body, said brackets having concave portions, bolts adjustably connecting the spades to the concave portions, said plates overlapping portions of the spades, and bolts extending through the plates and brackets to secure them together and to the body and clamp the adjacent portions of the spades.

4. A basin-forming agricultural implement comprising a rotatable body, a spade rotatable with said body, said spade being a concave disk, and means mounting the disk for rotatable adjustment when an edge portion becomes dull.

OSCAR E. MILLER.
GUSTAF E. MILLER.